(12) United States Patent
Yoshie

(10) Patent No.: US 9,077,967 B2
(45) Date of Patent: Jul. 7, 2015

(54) IMAGE REPRODUCTION APPARATUS AND CONTROL METHOD THEREFOR

(75) Inventor: Ryoji Yoshie, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 840 days.

(21) Appl. No.: 13/206,696

(22) Filed: Aug. 10, 2011

(65) Prior Publication Data

US 2012/0056990 A1    Mar. 8, 2012

(30) Foreign Application Priority Data

Sep. 3, 2010   (JP) ................. 2010-197736

(51) Int. Cl.
*H04N 13/02*   (2006.01)
*H04N 13/00*   (2006.01)
(52) U.S. Cl.
CPC ....... *H04N 13/0055* (2013.01); *H04N 13/0022* (2013.01)
(58) Field of Classification Search
CPC ..................... H04N 13/0022; H04N 13/0055
See application file for complete search history.

(56) References Cited

U.S. PATENT DOCUMENTS

2010/0150523 A1* 6/2010 Okubo et al. ................ 386/68
2012/0170909 A1* 7/2012 Chung et al. ............... 386/248

FOREIGN PATENT DOCUMENTS

| JP | 2005-110121 | 4/2005 |
| JP | 2008-103820 | 5/2008 |
| JP | 2011-109294 A | 6/2011 |
| WO | 2011-080878 A1 | 7/2011 |

OTHER PUBLICATIONS

A Mar. 4, 2014 Japanese Office Action, which is enclosed without English Translation, that issued in Japanese Patent Application No. 2010-197736.

* cited by examiner

*Primary Examiner* — Andy Rao
*Assistant Examiner* — Tyler Edwards
(74) *Attorney, Agent, or Firm* — Cowan, Liebowitz & Latman, P.C.

(57) ABSTRACT

An image reproduction apparatus includes: a reproduction unit that reproduces a stereo image; a mode setting unit that sets one mode from a plurality of modes which include a first mode and a second mode; an adjustment unit that adjusts a maximum value of a disparity between an image for left eye and an image for right eye of the stereo image according to the mode that has been set by the mode setting unit; and a generation unit that generates a stereo image from the image for left eye and the image for right eye for which the disparity has been adjusted by the adjustment unit and outputs the generated stereo image, wherein the adjustment unit makes a maximum value of the disparity in the second mode less than a maximum value of the disparity in the first mode.

18 Claims, 12 Drawing Sheets

FIG. 2
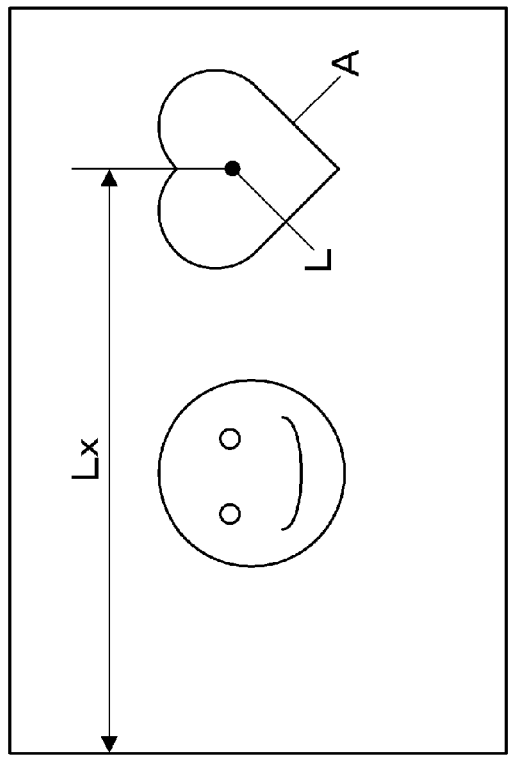
IMAGE FOR LEFT EYE
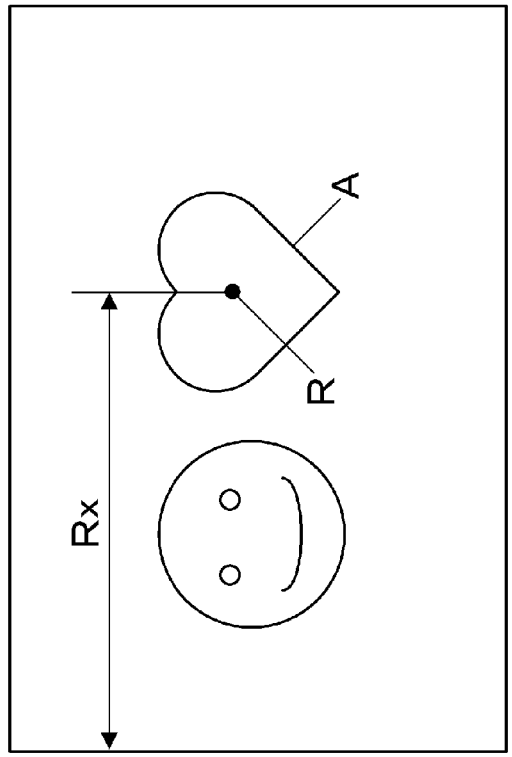
IMAGE FOR RIGHT EYE

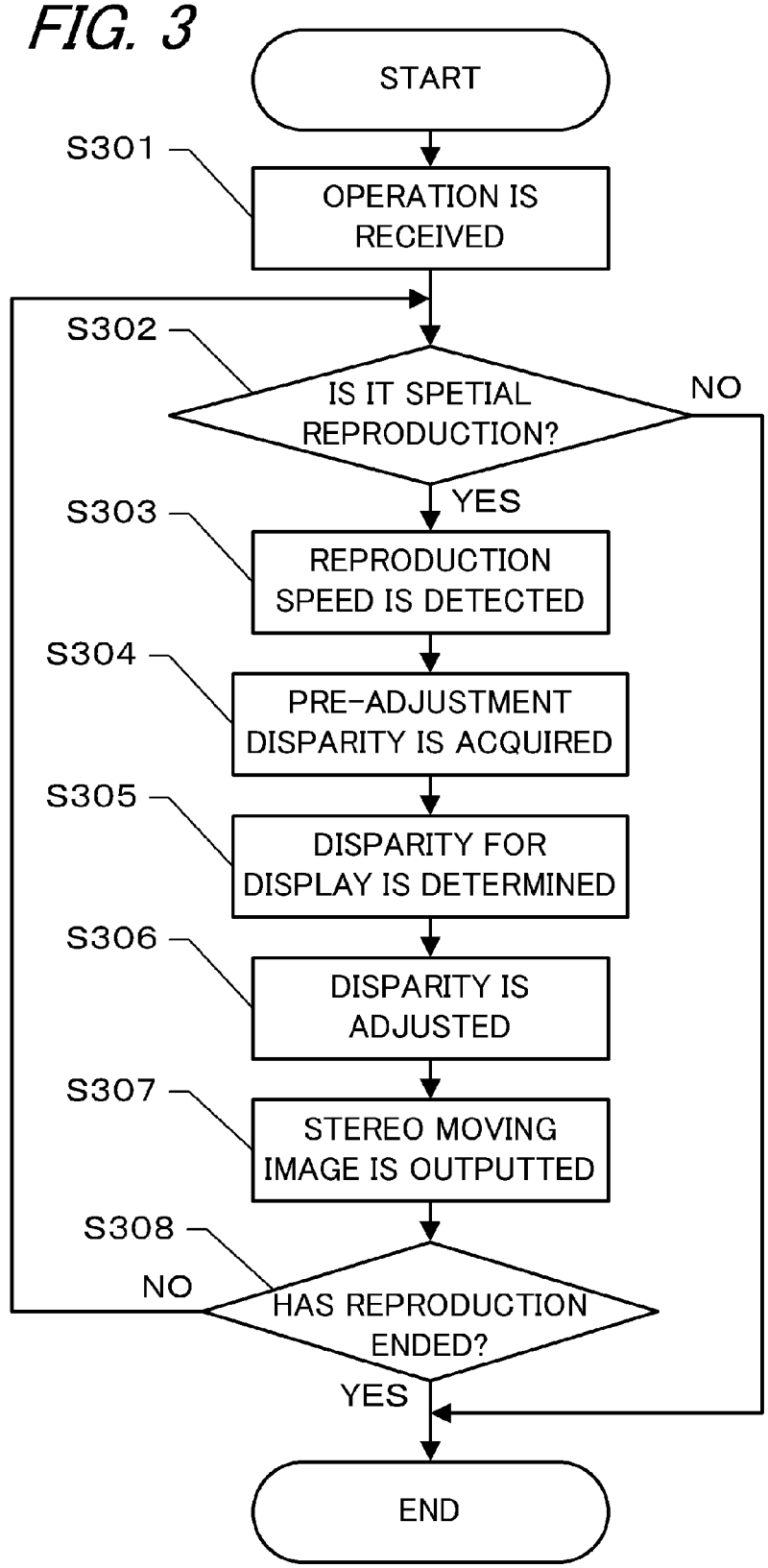

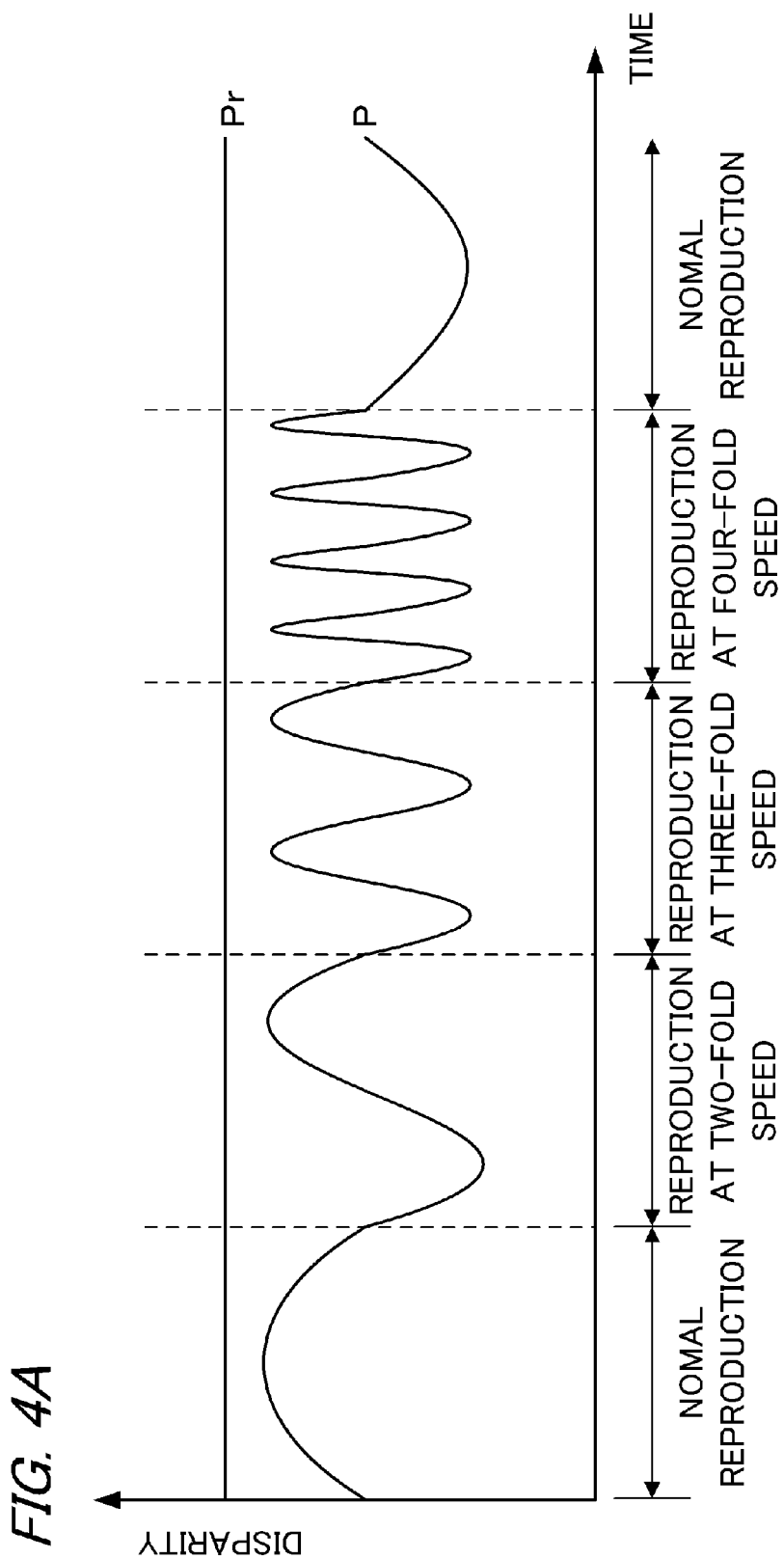

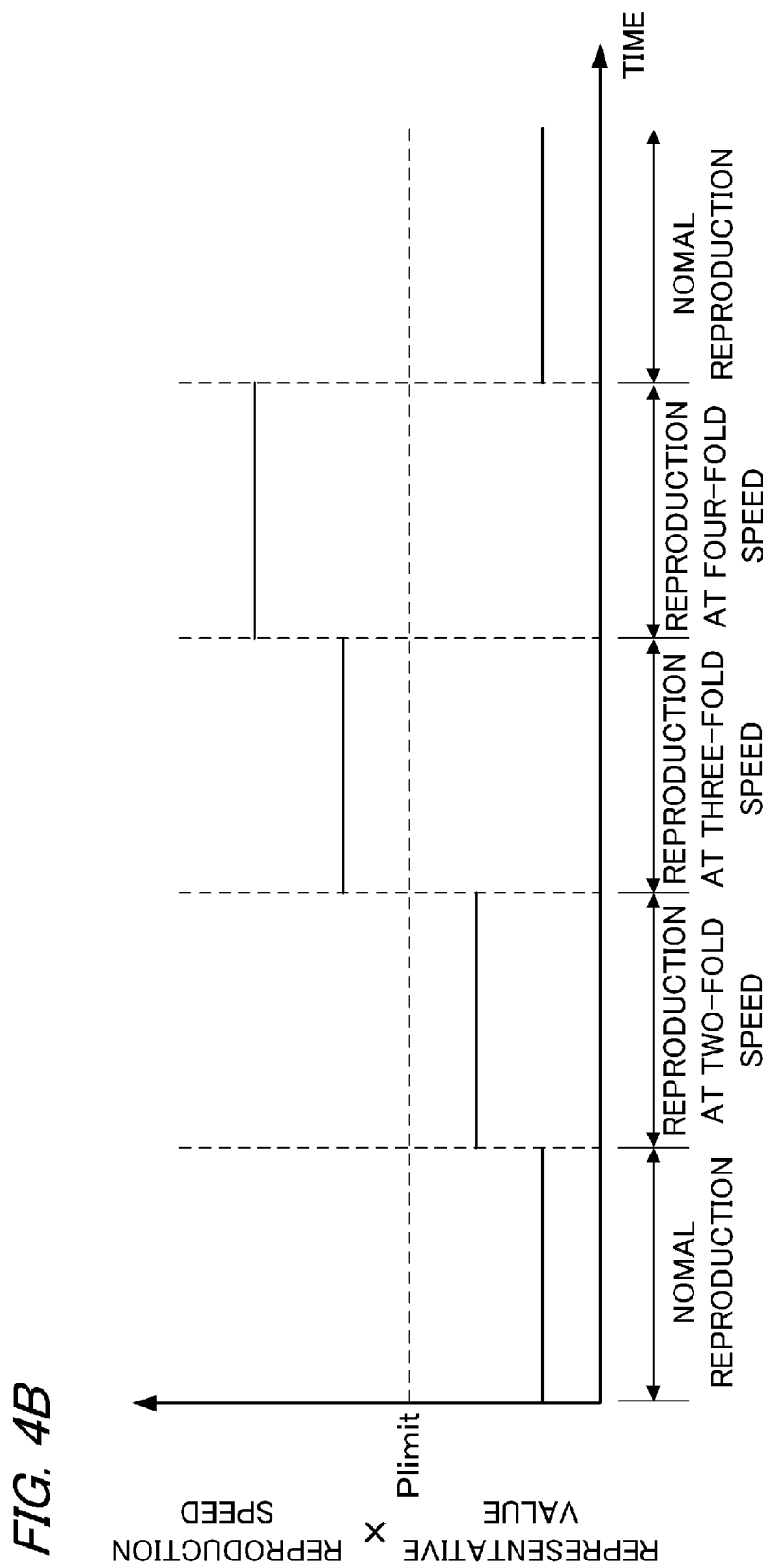

FIG. 7

| REPRODUCTION SPEED: S | SHIFT VALUE: α |
|---|---|
| 1 | 0 |
| 2 | 10 |
| 3 | 20 |
| 4 | 30 |

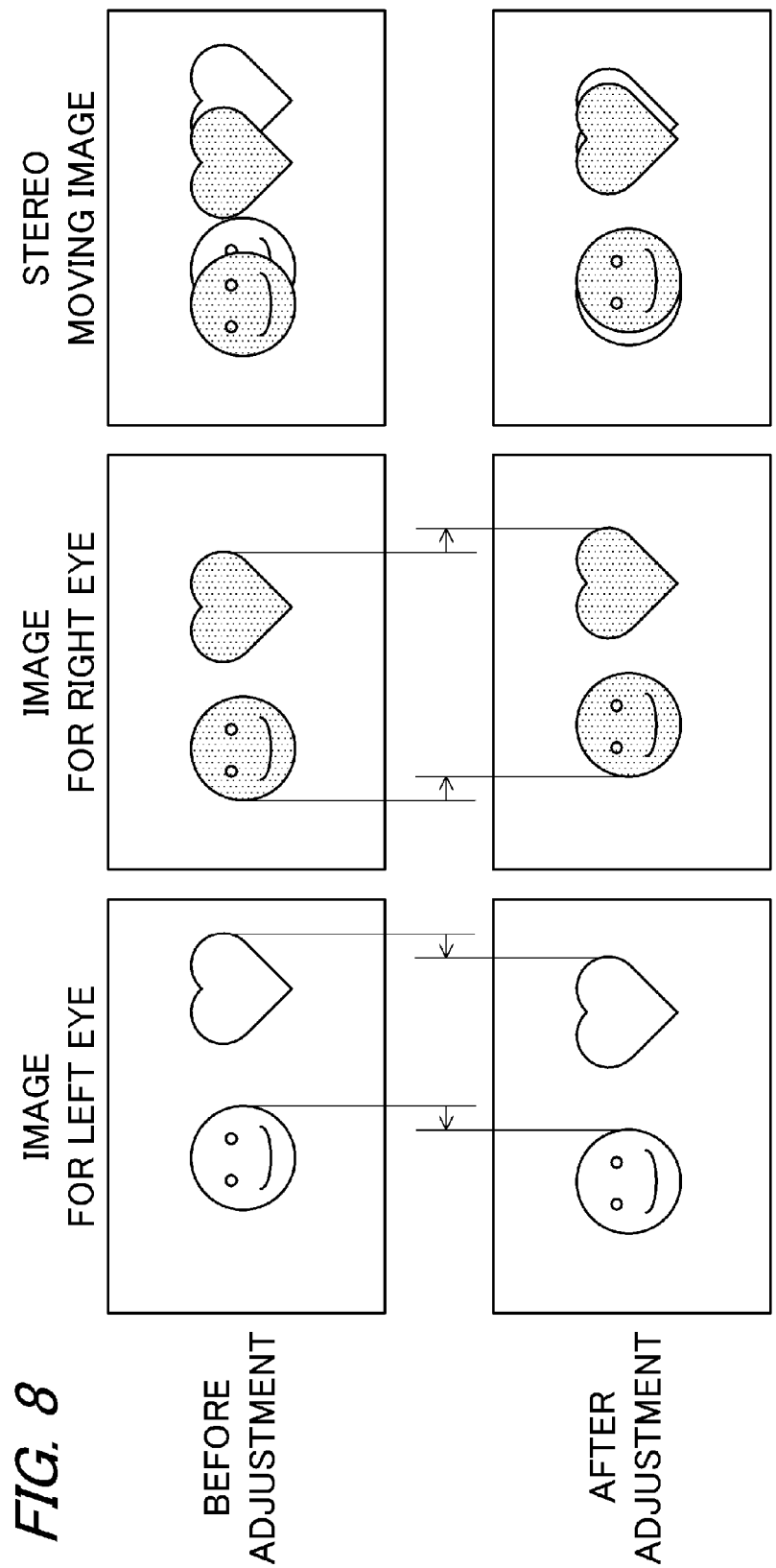

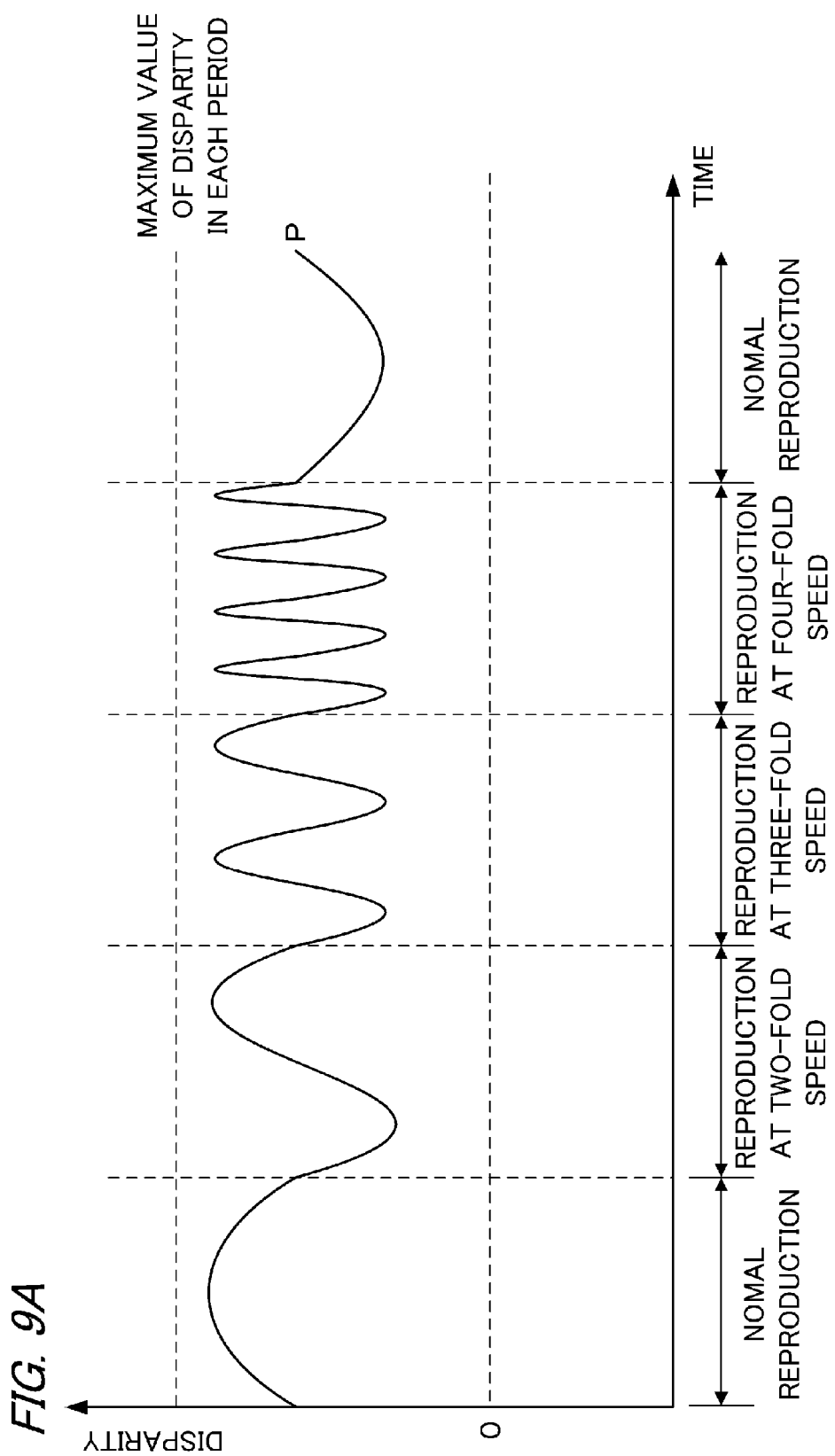

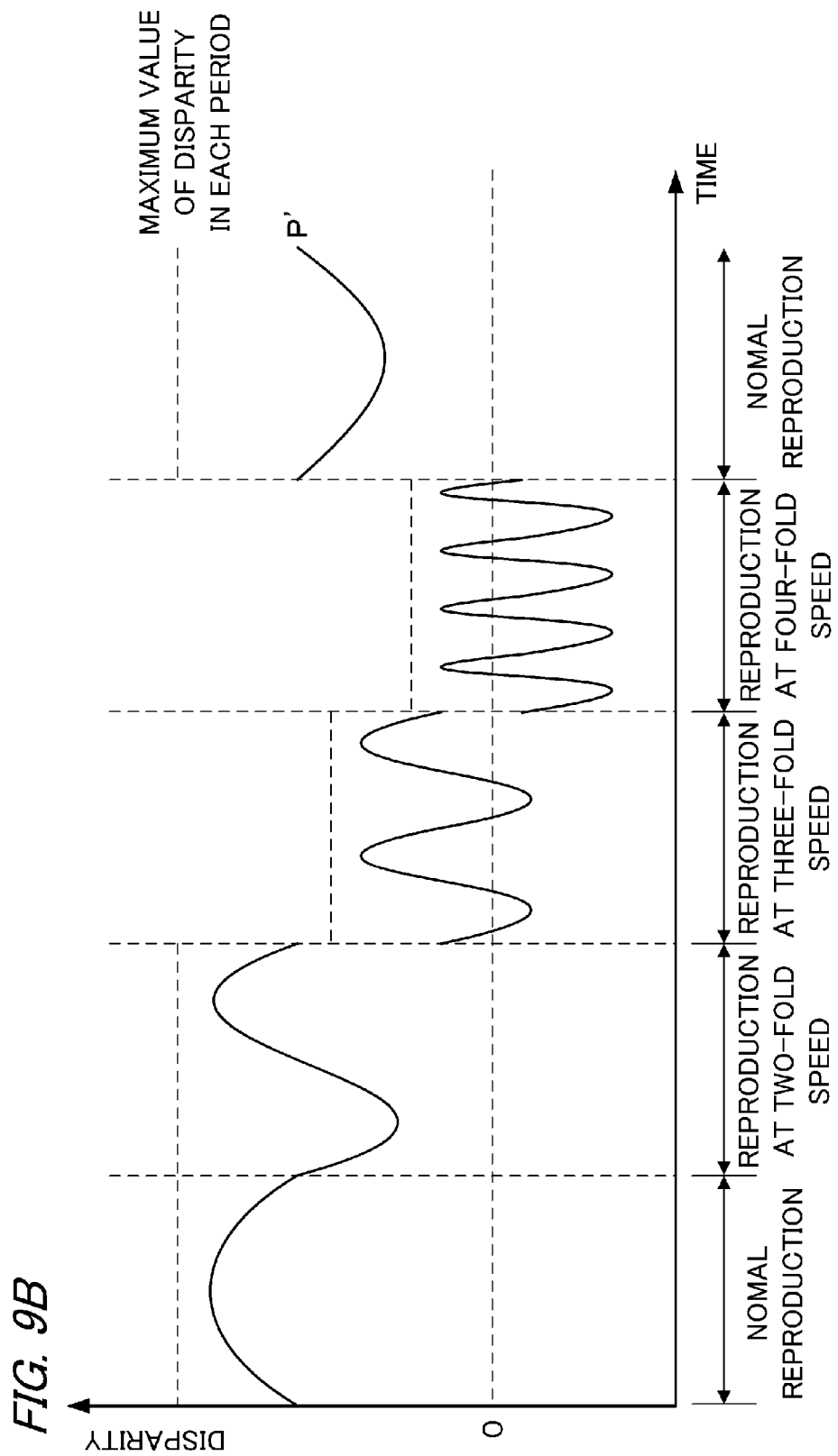

IMAGE REPRODUCTION APPARATUS AND CONTROL METHOD THEREFOR

BACKGROUND OF THE INVENTION

1. Field of the Invention

The present invention relates to an image reproduction apparatus and a control method therefor.

2. Description of the Related Art

A technique that makes it possible to view a three-dimensional stereo image (referred to hereinbelow as "stereo image") having a depth feel by showing an image for left eye and an image for right eye having a disparity to the left eye and right eye of the viewer respectively is known. When such stereo image (stereo moving image) is viewed, abrupt changes in disparity are known to enhance visual fatigue. Therefore, when a stereo moving image is created, attentions should be taken to prevent the occurrence of abrupt disparities variations in the scene, such as scene changes.

However, in the case of stereo moving images having such attentions associated therewith, abrupt disparity changes can occur when special reproduction such as fast forwarding or rewinding is performed in a reproduction apparatus.

Where a case is considered in which the recorded stereo moving image is viewed in a fast-forward mode for time-saving, it is desirable that visual fatigue be not enhanced even in special reproduction. To solve this problem, a technique has been suggested by which the stereo display (3-D mode) is switched to flat display (2-D mode) during fast forwarding or rewinding (see, for example, Japanese Patent Application Publication Nos. 2008-103820 and 2005-110121).

However, with the above-mentioned conventional technique, since switching to flat display is performed during special reproduction, the advantages of stereo moving image are lost.

SUMMARY OF THE INVENTION

Accordingly, the present invention provides a technique that can reduce the visual fatigue even at a high reproduction speed, while maintaining the advantages of stereo images.

The present invention in its first aspect provides an image reproduction apparatus comprising:

a reproduction unit that reproduces a stereo image including an image for left eye and an image for right eye having a disparity;

a mode setting unit that sets one mode from a plurality of modes which include a first mode in which the reproduction unit reproduces the stereo image at a first reproduction speed that is higher than a normal reproduction speed and a second mode in which the reproduction unit reproduces the stereo image at a second reproduction speed that is higher than the first reproduction speed;

an adjustment unit that adjusts a maximum value of the disparity between the image for left eye and the image for right eye of the stereo image according to the mode that has been set by the mode setting unit; and a generation unit that generates a stereo image from the image for left eye and the image for right eye for which the disparity has been adjusted by the adjustment unit and outputs the generated stereo image, wherein the adjustment unit makes a maximum value of the disparity in the second mode less than a maximum value of the disparity in the first mode.

The present invention in its second aspect provides a control method for an image reproduction apparatus, the method comprising:

a reproduction step of reproducing a stereo image including an image for left eye and an image for right eye having a disparity;

a mode setting step of setting one mode from a plurality of modes which include a first mode in which the stereo image is reproduced at a first reproduction speed that is higher than a normal reproduction speed in the reproduction step and a second mode in which the stereo image is reproduced at a second reproduction speed that is higher than the first reproduction speed in the reproduction step;

an adjustment step of adjusting a maximum value of the disparity between the image for left eye and the image for right eye of the stereo image according to the mode that has been set by the mode setting unit; and a generation step of generating a stereo image from the image for left eye and the image for right eye for which the disparity has been adjusted in the adjustment step and outputting the generated stereo image, wherein in the adjustment step, a maximum value of the disparity in the second mode is made less than a maximum value of the disparity in the first mode.

According to the present invention, the visual fatigue can be reduced even at a high reproduction speed, while maintaining the advantages of stereo images.

Further features of the present invention will become apparent from the following description of exemplary embodiments with reference to the attached drawings.

BRIEF DESCRIPTION OF THE DRAWINGS

FIG. 2 shows an example of one set of image for left eye and image for right eye;

FIG. 3 shows an example of processing flow in the stereo moving image reproduction apparatus according to Embodiment 1;

FIGS. 4A to 4C show a specific example of disparity adjustment according to Embodiment 1;

FIG. 7 shows an example of a table in which a shift value is associated with a reproduction speed;

FIG. 8 shows an example of disparity adjustment method according to Embodiment 2; and FIGS. 9A and 9B show a specific example of disparity adjustment according to Embodiment 2.

DESCRIPTION OF THE EMBODIMENTS

<Embodiment 1>

An image reproduction apparatus (stereo moving image reproduction apparatus) and a control method therefor according to Embodiment 1 of the present invention will be described below.

Figure 1:
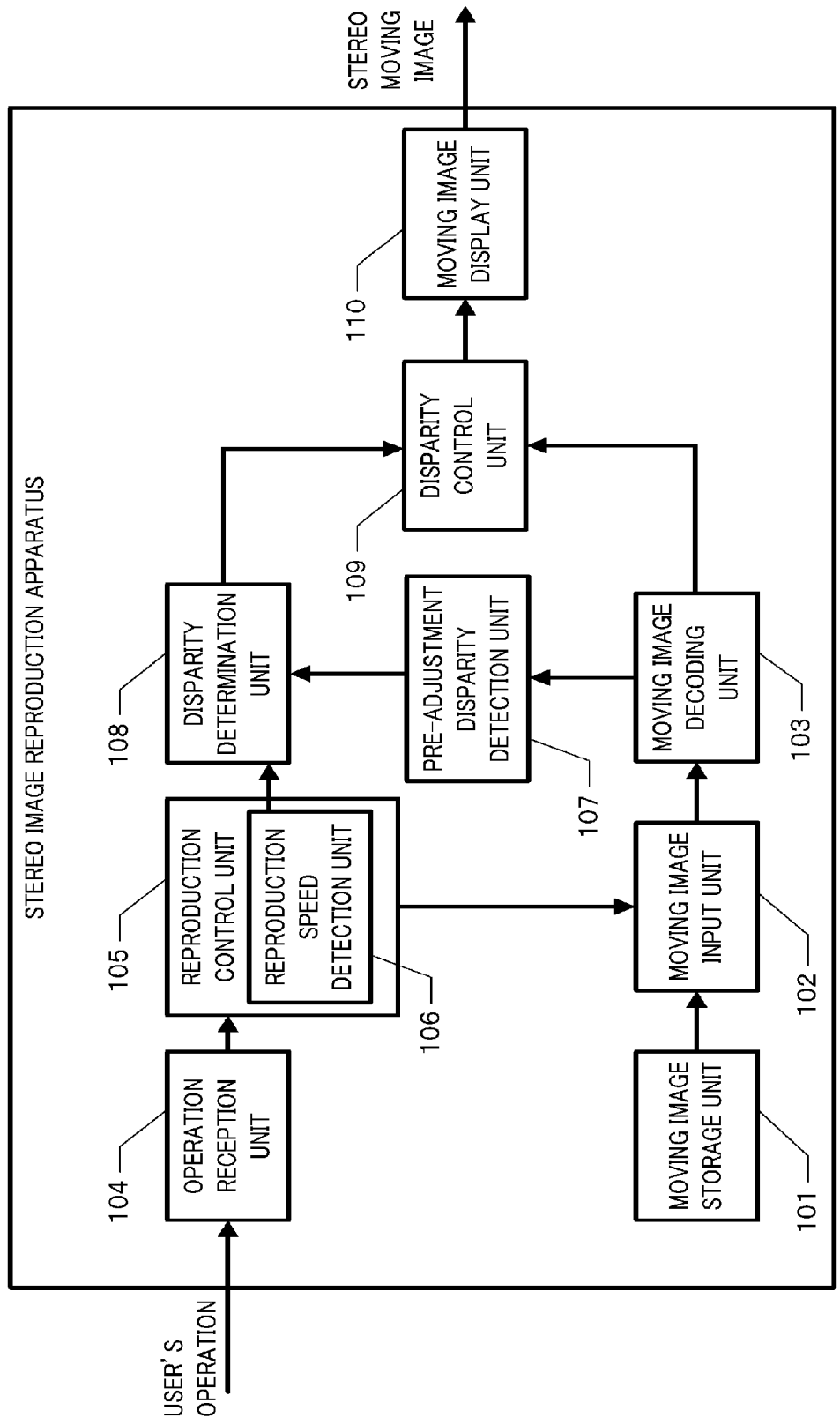
FIG. 1 illustrates a schematic configuration of the stereo moving image reproduction apparatus according to Embodiment 1.

FIG. 1 is a block diagram illustrating the schematic configuration of the stereo moving image reproduction apparatus according to the present embodiment.

A moving image storage unit 101 is a storage apparatus that stores stereo images (stereo moving images) that will be displayed. A stereo moving image is a moving image including an image for left eye and an image for right eye having a disparity. For example, a magnetic disk such as a HDD (Hard Disk Drive), a memory such as a SD card (Secure Digital memory card) (trade name), and an optical disk such as a DVD (Digital Versatile Disk) (trade name) and a Blu-ray disk (trade name) can be used as the moving image storage unit 101.

A moving image input unit 102 reads the stereo moving image stored in the moving image storage unit 101 and outputs the image to a moving image decoding unit 103.

The moving image decoding unit 103 performs decoding processing of the stereo moving image. For example, the stereo moving image is encoded by the MPEG (Motion Picture Expert Group) and decoded by the moving image decoding unit 103.

The stereo moving image is reproduced by the moving image input unit 102 and the moving image decoding unit 103.

An operation reception unit 104 acquires a signal corresponding to the user's operation from an input unit such as a button provided at a remote controller (not shown in the figure) or the body of the stereo moving image reproduction apparatus and outputs an operation indication signal corresponding to the acquired signal (that is, the user's operation) to a reproduction control unit 105. The operation indication signal is a signal indicating a reproduction mode, such as reproduction, stop, pause, fast forward, and rewind, of the stereo moving image.

The reproduction control unit 105 sets one mode from a plurality of modes which include the first mode in which the stereo image is reproduces with a first reproduction speed that is higher than the normal reproduction speed and a second mode in which the stereo image is reproduced with a second reproduction speed that is higher than the first reproduction speed. More specifically, the reproduction control unit 105 controls the moving image input unit 102 and the moving image decoding unit 103 according to the operation indication signal acquired from the operation reception unit 104. Further, the reproduction control unit 105 has a reproduction speed detection unit 106.

The reproduction speed detection unit 106 detects the reproduction speed of the stereo moving image on the basis of the operation indication signal and outputs the detected reproduction speed to a disparity determination unit 108.

A pre-adjustment disparity detection unit 107 analyzes the stereo moving image that has been decoded by the moving image decoding unit 103, acquires the disparity (disparity before adjustment of the stereo moving image; pre-adjustment disparity) inherent to the stereo moving image, and outputs the acquired disparity to the disparity determination unit 108.

The disparity is, for example, a shift value of an object in the eye width direction in a set of an image for left eye and an image for right eye, which makes it possible to see a stereo moving image three dimensionally. The disparity is explained below in greater detail with reference to FIG. 2. FIG. 2 shows an example of a set of an image for left eye and an image for right eye. In FIG. 2, an X coordinate value (coordinate value in the horizontal direction) of a position L of an object A in the image for left eye is denoted by Lx, and an X coordinate value of a position R (position corresponding to the position L) of the object A in the image for right eye is denoted by Rx. The disparity PA of the object A can be determined by the following Eq. (1).

$$PA = Lx - Rx \quad \text{(Eq. 1)}$$

When PA has a positive value, it means that the object A is seen three-dimensionally to be present on the user's side with respect to the display screen. Where PA has a negative value, it means that the object A is seen three-dimensionally to be present deeper than the display screen, when viewed from the user.

The explanation of disparity above is given with respect to the area-unit (object-unit) disparity, but the pre-adjustment disparity also may be of pixel unit, area unit (object unit), and image unit. All of the above-mentioned disparities may be acquired as the pre-adjustment disparity. A variation value of the disparity per unit time may be also acquired as the pre-adjustment disparity.

The disparity determination unit 108 and the disparity control unit 109 adjust the maximum value of the disparity between the image for left eye and image for right eye of the stereo moving image according to the mode that has been set. In the present embodiment, the maximum value of the disparity in the second mode is made less than the maximum value of the disparity in the first mode. Further, in the present embodiment, the disparity determination unit 108 and the disparity control unit 109 adjust (decrease) the maximum value of the disparity between the image for left eye and image for right eye when the reproduction speed detected by the pre-adjustment disparity detection unit 107 is higher than a threshold. A large disparity is thought to enhance visual fatigue. Therefore, with such a configuration, visual fatigue can be reduced even when the reproduction speed is high.

More specifically, the disparity determination unit 108 determines a disparity at the time of display (disparity for display) from the pre-adjustment disparity acquired by the pre-adjustment disparity detection unit 107 and the reproduction speed detected by the reproduction speed detection unit 106 and outputs the determined disparity for display to the disparity control unit 109.

The disparity control unit 109 adjusts the disparity (pre-adjustment disparity) of the stereo moving image according to the disparity for display determined by the disparity determination unit 108.

In the present embodiment, the disparity is adjusted by shifting the display position of the object included in the image for left eye in a horizontal direction relative to the display position of the object included in the image for right eye. The horizontal direction referred to herein means a shift direction (eye width direction) of the image for left eye and image for right eye, or a direction parallel to the arrangement plane of the display apparatus that displays the stereo moving image. However, this method for disparity adjustment is not limiting. For example, the disparity may be also adjusted by detecting correspondence positions (correspondence points) between the image for left eye and image for right eye and shifting these correspondence points on the straight line or curve connecting these correspondence points. The disparity may be also adjusted on the basis of the so-called depth map which indicates position in the depthwise direction of each object in the image from the image for left eye and image for right eye.

The moving image display unit 110 generates a stereo moving image from the image for left eye and image for right eye for which the disparity has been adjusted by the disparity control unit 109 and outputs the generated stereo moving image to a display apparatus (not shown in the figure).

The flow of processing performed in the stereo moving image reproduction apparatus according to the present embodiment will be explained below by using the flowchart shown in FIG. 3. The processing of reading the stereo moving image with the moving image input unit 102 and decoding with the moving image decoding unit 103 is performed parallel with the present flowchart in response to the user's operation. The stereo moving image may be read in one-frame units or in group units when a plurality of frames are grouped.

First, in S301, the operation reception unit 104 acquires a signal outputted from the input unit in response to the user's operation and outputs the operation indication signal corresponding to the acquired signal to the reproduction control unit 105.

Then, in S302, the reproduction control unit 105 determines whether or not the inputted operation indication signal is a signal indicating special reproduction. The special reproduction as referred to herein is a reproduction for which the reproduction speed is different from the reproduction speed during the normal reproduction. For example, the special reproduction is a pause, a fast-forward reproduction, or a rewinding reproduction.

When the operation indication signal is a signal indicating special reproduction, the processing advances to S303, and when the operation indication signal is not a signal indicating special reproduction, the processing is ended.

In S303, the reproduction speed detection unit 106 detects the reproduction speed S. In the present embodiment, the reproduction detection unit 106 detects a relative speed that is related to the reproduction speed during the normal reproduction (normal reproduction speed) as the reproduction speed S. For example, in the case of settings such that when the fast forward button of the remote controller is pushed once, fast-forward reproduction is performed at a two-fold speed, and when the fast forward button is pushed twice, the fast-forward reproduction is performed at a four-fold speed, when the fast forward button is pushed once, S=2 is detected, and when the fast forward button is pushed twice, S=4 is detected.

In S304 that follows S303, the pre-adjustment disparity detection unit 107 acquires the pre-adjustment disparity of the stereo moving image.

The pre-adjustment disparity may be acquired in advance by performing analysis during normal reproduction, or may be acquired by decoding the moving image data relating to a fixed time interval when special reproduction is indicated. When information on disparity is included in metadata appended to the stereo moving image, this information may be also used.

Further, in S305, the disparity determination unit 108 determines disparity for display from the pre-adjustment disparity acquired from the pre-adjustment disparity detection unit 107 and the reproduction speed acquired from the reproduction speed detection unit 106. Then, in S306, the disparity control unit 109 adjusts the disparity of the stereo moving image according to the disparity for display that has been determined in S305.

The visual fatigue caused by disparity is thought to be enhanced by increased reproduction speed of stereo moving image when the same stereo moving image is viewed. Therefore, in the present embodiment, the maximum value of disparity between the image for left eye and image for right eye is adjusted so as to decrease with the increase in the reproduction speed of the stereo moving image (as a result, the maximum value of disparity in the second mode becomes less than the maximum value of disparity in the first mode). With such a configuration, the visual fatigue can be reduced according to the reproduction speed.

Further, in the present embodiment, when the detected reproduction speed is higher than the threshold, the change in disparity between the image for left eye and image for right eye can be reduced. Therefore, the visual fatigue can be further reduced.

More specifically, the disparity after the adjustment (disparity P' for display) is calculated (determined) by multiplying the disparity between the image for left eye and image for right eye (pre-adjustment disparity P) by a reduction ratio β determined by using the detected reproduction speed S (reproduction speed of the mode that has been set). The relationship between the pre-adjustment disparity P and disparity P' for display is represented by Eq. 2 below by using the reduction ratio β.

$$P' = P \times \beta \quad \text{(Eq. 2)}$$

Further, in the present embodiment, the reduction ratio β is calculated by using the following Eqs. 3-1 and 3-2.

$$\beta = 1 \text{ when } Pr \times S \leq P\text{limit} \quad \text{(Eq. 3-1)}$$

$$\beta = a/S \ (<1) \text{ when } Pr \times S > P\text{limit} \quad \text{(Eq. 3-2)}$$

Here, Pr is a representative value (representative disparity) of the pre-adjustment disparity, Plimit is a threshold determining whether or not to adjust the disparity value of the stereo moving image, a is a predetermined constant. When the pre-adjustment disparity is a disparity of pixel unit or area (object) unit, the maximum value or average value thereof can be taken as the representative disparity. When the pre-adjustment disparity is a disparity of image unit, the pre-adjustment disparity can be taken as the representative disparity. However, the representative disparity is not limited to above-described options and may be a value determined by using the pre-adjustment disparity. Further, the representative disparity may be calculated for each frame or for a plurality of frames. The representative disparity is determined by the disparity determination unit 108 by using the disparity detected by the pre-adjustment disparity detection unit 107.

As shown in Eqs. 3-1 and 3-2, in the present embodiment, whether or not to adjust the disparity of stereo moving image is determined according to whether or not the value obtained by multiplying the representative value (representative disparity) of the pre-adjustment disparity by the reproduction speed S is equal to or higher than the value of Plimit. Therefore, Plimit/Pr becomes a threshold for reproduction speed that determines whether or not to adjust the disparity. Thus, in the present embodiment, the threshold (Plimit/Pr) for reproduction speed that determines whether or not to adjust the disparity decreases with the increase in the representative value (representative disparity Pr). By so determining whether or not to adjust the disparity, it is possible to adjust the disparity of a stereo moving image with a large representative value (representative disparity Pr) even when the difference between a fast-forward speed and the reproduction speed during normal reproduction is small. By using such a configuration, it is possible to reduce the visual fatigue according to the representative disparity Pr. The method for determining whether or not to adjust the disparity of the stereo moving image is not limited to the above described method using the equations 3-1 and 3-2. For example, whether or not to adjust the disparity of the stereo moving image may be determined on the basis of only a value of reproduction speed S.

The disparity adjustment method is not limited to the above-described methods.

For example, it is also possible to store a table in which the reduction ratio β is associated with reproduction speed, use the table to determine the reduction ratio β to be used, and adjust the disparity.

Further, it is also possible to store an allowed value for each reproduction speed in advance and set the reduction ratio β so that the representative value of the disparity after the adjustment becomes equal to or less than the allowed value determined according to the reproduction speed detected by the reproduction speed detection unit 106. More specifically, when the representative disparity Pr exceeds the allowed value corresponding to the detected reproduction speed, a value obtained by dividing the allowed value by the representative disparity Pr may be taken as the reduction ratio β. In this case, the reproduction speed corresponding to the minimum value of the allowed value that is equal to or higher than the representative disparity Pr becomes as a threshold value determining whether to adjust the disparity.

The disparity between the image for left eye and image for right eye may be reduced uniformly by the same value, regardless of position. For example, the disparity between the image for left eye and image for right eye may be reduced by shifting the image for left eye in the horizontal direction relative to the image for right eye. Further, the shift value may be set so that the representative value of disparity after the adjustment becomes equal to or less than the allowed value determined according to the detected reproduction speed. More specifically, the disparity P' for display may be determined by subtracting the representative disparity Pr from the allowed value and adding the result (the obtained shift value) to the pre-adjustment disparity P.

In S307 that follows S306, the moving image display unit 110 generates a stereo moving image from the image for left eye and image for right eye for which the disparity has been adjusted in S306 and outputs the generated stereo moving image to the display apparatus.

In S308, the reproduction control unit 105 determines whether the stereo moving image has been reproduced to the very end or the reproduction has been stopped by the user's operation or the like. When the reproduction continues, the processing flow returns to S302.

A specific example of disparity adjustment according to the present embodiment will be explained below with reference to FIGS. 4A to 4C.

Figure 4C:
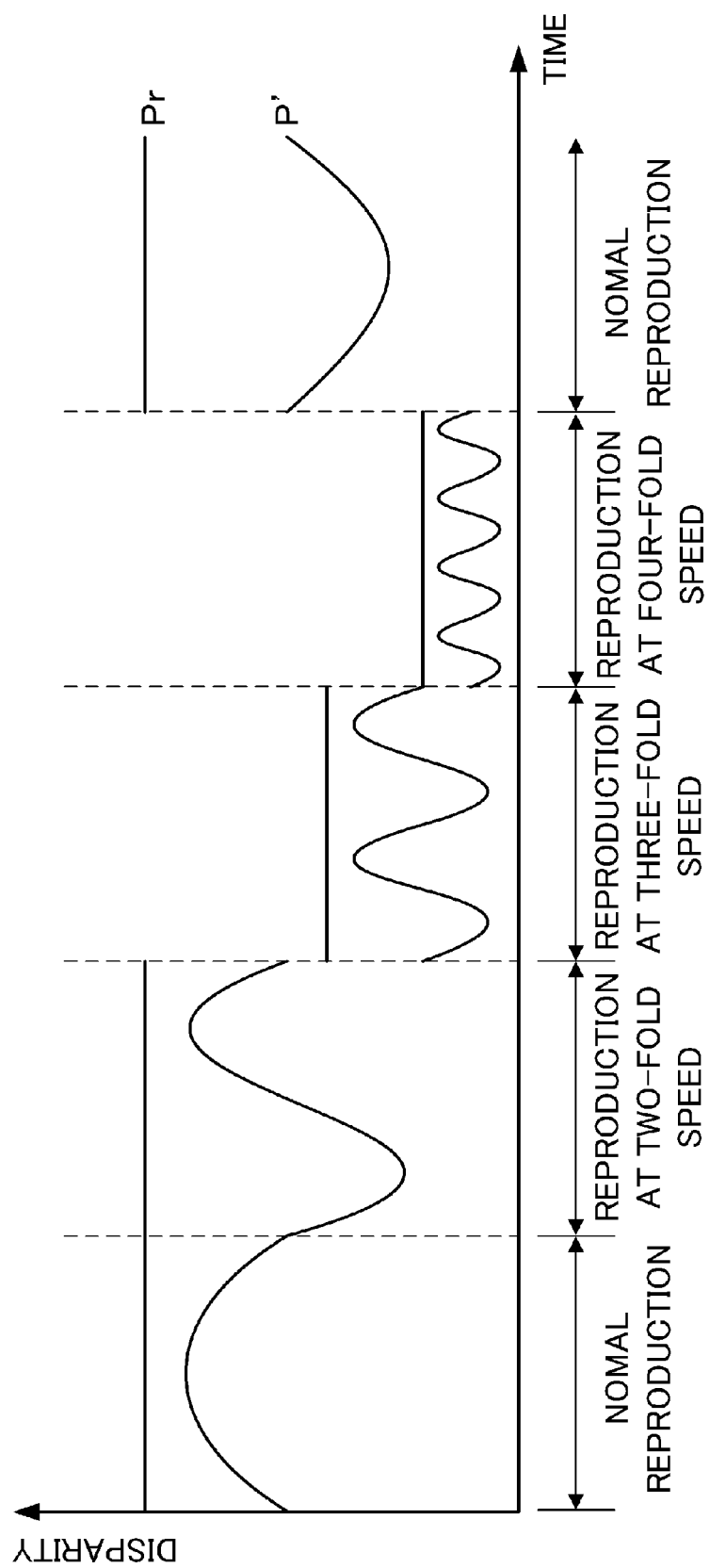

FIGS. 4A to 4C show the variations in disparity and Pr×S in the case in which the reproduction speed is changed from the normal reproduction to reproduction at a two-fold speed (fast-forward reproduction at a two-fold speed), reproduction at a four-fold speed, and reproduction at an eight-fold speed and finally returned to the normal reproduction. FIG. 4A is a graph showing how the pre-adjustment disparity P and representative disparity Pr change with the elapsed time. FIG. 4B shows how Pr×S changes with the elapsed time. FIG. 4C shows how the disparity P' for display and the representative disparity after the adjustment change with the elapsed time. For the sake of simplicity, the pre-adjustment disparity P is assumed to change periodically. FIGS. 4A to 4C illustrate an example in which the maximum value of the pre-adjustment disparity within a predetermine period is taken as the representative disparity.

FIG. 4A demonstrates that variations in disparity (pre-adjustment disparity) become significant as the reproduction speed increases. In the present embodiment, as shown in FIG. 4C, the disparity and the amplitude of variations thereof are decreased as the reproduction speed increases. As a result, the visual fatigue can be reduced even when the reproduction speed is high. Further, as shown in FIG. 4C, even when the reproduction speed is high, since the disparity between the image for left eye and image for right eye is not 0, advantages of stereo moving image can be retained.

As described hereinabove, according to the present embodiment, the maximum value of disparity in the second mode is made less than the maximum value of disparity in the first mode. Further, the stereo moving image is generated from the image for left eye and image for right eye for which the disparity has been adjusted. In addition, in the present embodiment, the maximum value of the disparity between the image for left eye and image for right eye is decreased when the reproduction speed is higher than the threshold value. Further, the stereo moving image is generated from the image for left eye and image for right eye for which the disparity has been adjusted. As a result, the visual fatigue can be reduced even when the reproduction speed is high, while retaining the advantages of stereo moving image.

Further, in the present embodiment, the disparity between the image for left eye and image for right eye is decreased monotonously with respect to the increase in the reproductions speed, but the disparity adjustment method is not limited this method. For example, in the reproduction at a three-fold speed and reproduction at a four-fold speed, the disparity may be reduced at the same reduction ratio.

Further, in the present embodiment, the disparity is adjusted in the case in which the reproduction speed is changed by the user's operation, but when the moving image reproduction apparatus changes the reproduction speed automatically, the disparity may be adjusted in response to these changes.

<Embodiment 2>

The stereo moving image reproduction apparatus and control method therefor according to Embodiment 2 of the present invention will be described below. In the present embodiment, the adjustment is performed without detecting (acquiring) the disparity between the image for left eye and image for right eye. Further, in the present embodiment, the disparity is adjusted by reducing the disparity between the image for left eye and image for right eye uniformly by the same value, regardless of the position. More specifically, the disparity is adjusted by shifting the image for left eye in the horizontal direction relative to the image for right eye.

Figure 5:
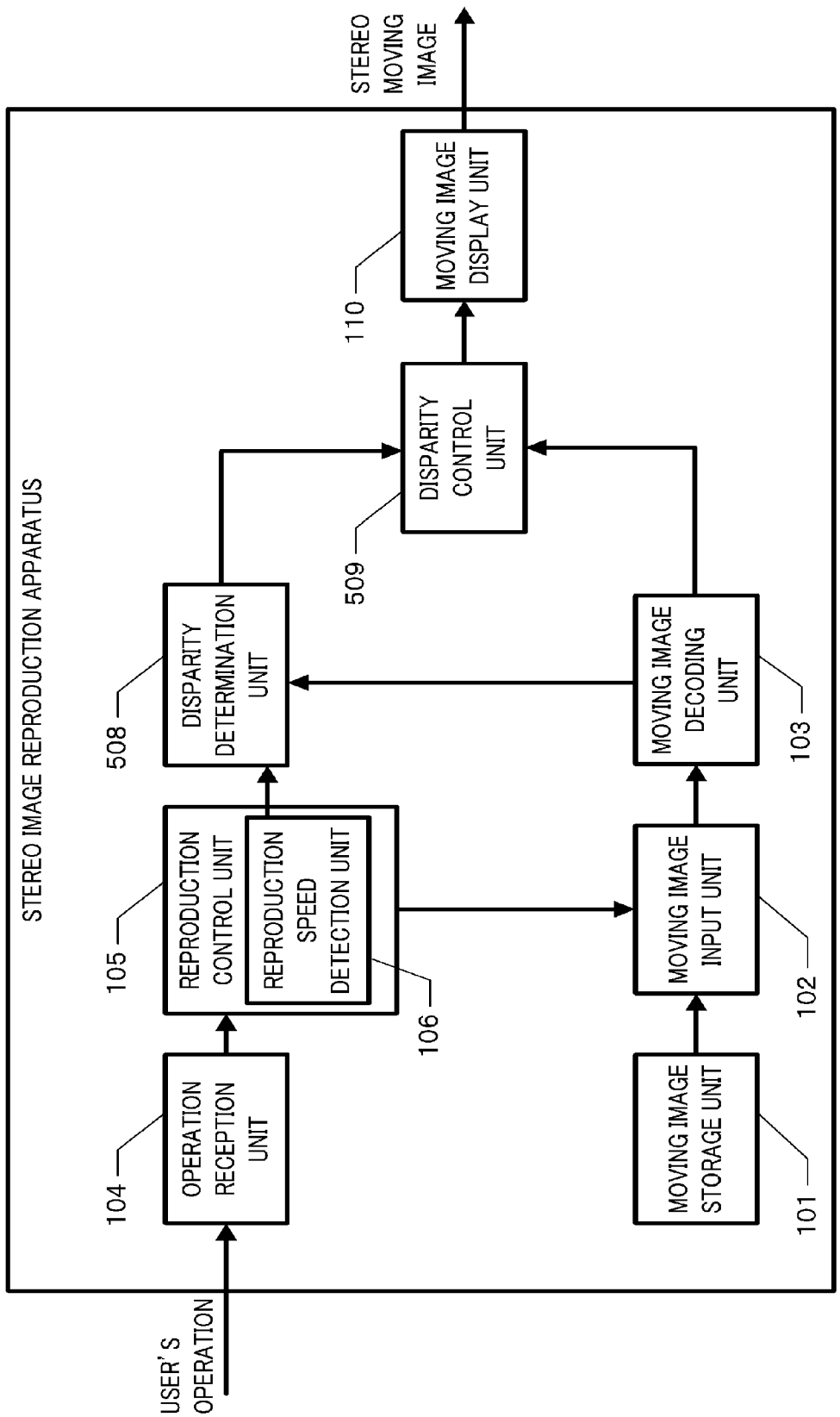
FIG. 5 illustrates a schematic configuration of the stereo moving image reproduction apparatus according to Embodiment 2.

FIG. 5 is a block diagram illustrating the schematic configuration of the stereo moving image reproduction apparatus according to the present embodiment. Functions similar to those of Embodiment 1 are assigned with same reference numerals and the explanation thereof is herein omitted.

The disparity determination unit 508 determines a shift value according to the reproduction speed detected by the reproduction speed detection unit 106 and outputs the determined shift value to the disparity control unit 509.

The disparity control unit 509 adjusts the disparity (pre-adjustment disparity) of the stereo moving image according to the shift value determined by the disparity determination unit 508.

Figure 6:
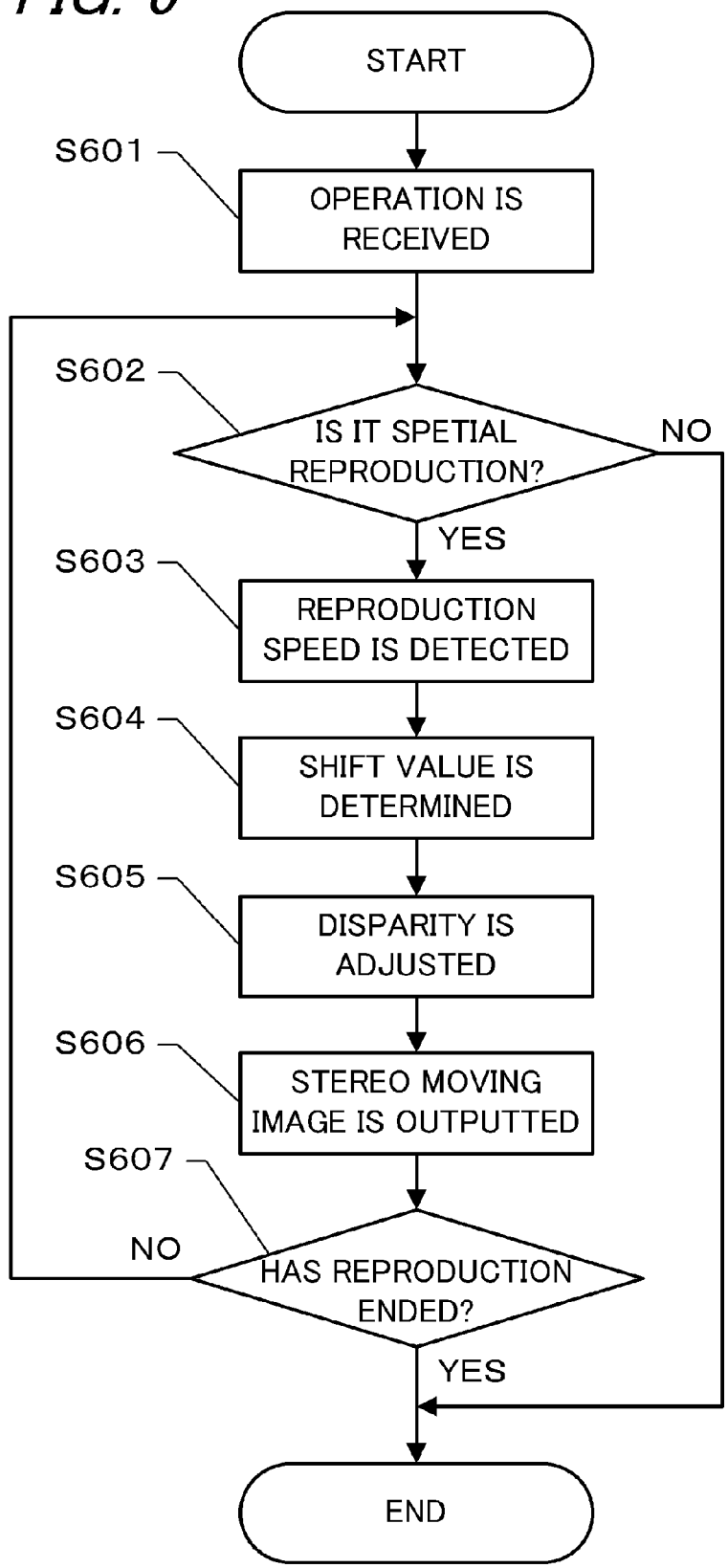
FIG. 6 shows an example of processing flow in the stereo moving image reproduction apparatus according to Embodiment 2.

The flow of processing performed in the stereo moving image reproduction apparatus according to the present embodiment will be explained below by using the flowchart shown in FIG. 6.

The processing of S601 to S603 is similar to that of S301 to S303 of Embodiment 1 (FIG. 3) and the explanation thereof is herein omitted.

In S604 that follows S603, the disparity determination unit 508 acquires the reproduction speed S from the reproduction speed detection unit 106 and determines the shift value from the acquired reproduction speed S.

More specifically, the shift value is determined by using the table in which the shift value a is associated with the reproduction speed S as shown in FIG. 7. FIG. 7 illustrates an example in which the reproduction speed during normal reproduction is taken as a threshold for determining whether to adjust the disparity. This method for determining the shift amount is not limiting. For example, the shift amount may be determined by using a function including the reproduction speed S as a variable.

In S605, the disparity control unit 509 shifts the image for left eye in the horizontal direction relative to the image for right eye by the shift amount determined in S604. More specifically, as shown in FIG. 8, the image for left eye and image for right eye are shifted by α/2 each in the direction of reducing the disparity (in FIG. 8, the image in which the image for left eye and image for right eye overlap is also shown as the "stereo moving image"). As a result, the disparity is adjusted and a value obtained by subtracting the shift amount α from the pre-adjustment disparity P becomes the disparity P' for display.

Then, in S606, the moving image display unit 110 generates a stereo moving image from the image for left eye and image for right eye for which the disparity has been adjusted in S605 and outputs the generated stereo moving image to the display apparatus.

Then, in S607, the reproduction control unit 105 determines whether the stereo moving image has been reproduced to the very end or the reproduction has been stopped by the user's operation or the like. When the reproduction continues, the processing flow returns to S602.

In the present embodiment, the image for left eye is shifted by the shift amount in the horizontal direction with respect to the image for right eye. Therefore, the end of the image for left eye or image for right eye is cutoff (the image spreads to the outside of the area (display area) of display at the display apparatus). Accordingly, when at least either of the image for left eye and image for right eye is outside of the display area due to the adjustment of disparity, the display is performed by enlarging the image for left eye and image for right eye and cutting out the area that can be viewed in stereo. Alternatively, the display may be performed by contracting the image for left eye and image for right eye to fit into the display area or interpolating the cut-off portion of the image for left eye or image for right eye.

A specific example of disparity adjustment according to the present embodiment will be explained below with reference to FIGS. 9A and 9B.

FIGS. 9A and 9B represent variations in disparity in the case in which the reproduction speed is changed from the normal reproduction mode reproduction at a two-fold speed, reproduction at a four-fold speed, and reproduction at an eight-fold speed and finally returned to the normal reproduction. FIG. 9A is a graph showing how the pre-adjustment disparity P changes with the elapsed time. FIG. 9B shows how the disparity P' for display changes with the elapsed time. For the sake of simplicity, the pre-adjustment disparity P is assumed to change periodically.

FIG. 9A demonstrates that variations in disparity (pre-adjustment disparity) per unit time become significant as the reproduction speed increases. In the present embodiment, as shown in FIG. 9B, the disparity of stereo moving image is adjusted to decrease as the reproduction speed increases. As a result, the visual fatigue can be reduced even when the reproduction speed is high. Further, as shown in FIG. 9B, even when the reproduction speed is high, advantages of stereo moving image can be retained.

As described hereinabove, according to the present embodiment, it is possible to reduce the visual fatigue, without detecting the disparity, even when the reproduction speed is high, while retaining the advantages of a stereo moving image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-197736, filed on Sep. 3, 2010, which is hereby incorporated by reference herein in its entirety.

What is claimed is:

1. An image reproduction apparatus comprising:
a reproduction unit that reproduces a stereo image including an image for left eye and an image for right eye having a disparity which is a shift value of an object in an eye width direction between the image for left eye and the image for right eye;
an acquisition unit that acquires a disparity between the image for left eye and the image for right eye for each of objects included in the stereo image;
a determination unit that determines a representative value of disparities acquired by the acquisition unit;
a mode setting unit that sets one mode from a plurality of modes which include a first mode in which the reproduction unit reproduces the stereo image at a first reproduction speed that is higher than a normal reproduction speed and a second mode in which the reproduction unit reproduces the stereo image at a second reproduction speed that is higher than the first reproduction speed, the normal reproduction speed being a reproduction speed during a normal reproduction;
an adjustment unit that adjusts a maximum value of the disparity between the image for left eye and the image for right eye of the stereo image on the basis of the representative value determined by the determination unit and the mode that has been set by the mode setting unit; and
a generation unit that generates a stereo image from the image for left eye and the image for right eye for which the disparity has been adjusted by the adjustment unit and outputs the generated stereo image, wherein
the adjustment unit makes a maximum value of the disparity in the first mode less than a maximum value of the disparity in the normal reproduction and makes a maximum value of the disparity in the second mode less than a maximum value of the disparity in the first mode.

2. The image reproduction apparatus according to claim 1, wherein the adjustment unit adjusts the maximum value of the disparity between the image for left eye and the image for right eye of the stereo image when a reproduction speed of the mode that has been set by the mode setting unit is higher than a threshold value.

3. The image reproduction apparatus according to claim 1, wherein the adjustment unit decreases the maximum value of the disparity between the image for left eye and the image for right eye as a reproduction speed of the mode that has been set by the mode setting unit increases.

4. The image reproduction apparatus according to claim 1, wherein the adjustment unit decreases the disparity between the image for left eye and the image for right eye uniformly by a same value.

5. The image reproduction apparatus according to claim 1, wherein the adjustment unit calculates the disparity after the adjustment by multiplying the disparity between the image for left eye and the image for right eye by a reduction ratio determined in use of a reproduction speed of the mode that has been set by the mode setting unit.

6. The image reproduction apparatus according to claim 4, wherein the adjustment unit decreases the disparity between the image for left eye and the image for right eye by shifting the image for left eye in a horizontal direction relative to the image for right eye.

7. The image reproduction apparatus according to claim 2, wherein
the adjustment unit decreases the threshold value as the representative value increases.

8. The image reproduction apparatus according to claim 5, wherein
the adjustment unit sets the reduction ratio so that a representative value of the disparity after the adjustment is equal to or less than an allowed value determined according to the reproduction speed of the mode that has been set by the mode setting unit.

9. The image reproduction apparatus according to claim 6, wherein
the adjustment unit sets a shift value so that a representative value of the disparity after the adjustment is equal to or less than an allowed value determined according to the reproduction speed of the mode that has been set by the mode setting unit.

10. A control method for an image reproduction apparatus, the method comprising:
a reproduction step of reproducing a stereo image including an image for left eye and an image for right eye having a disparity which is a shift value of an object in an eye width direction between the image for left eye and the image for right eye;
an acquisition step of acquiring a disparity between the image for left eye and the image for right eye for each of objects included in the stereo image;
a determination step of determining a representative value of disparities acquired by the acquisition step;
a mode setting step of setting one mode from a plurality of modes which include a first mode in which the stereo image is reproduced at a first reproduction speed that is higher than a normal reproduction speed in the reproduction step and a second mode in which the stereo image is reproduced at a second reproduction speed that is higher than the first reproduction speed in the reproduction step, the normal reproduction speed being a reproduction speed during a normal reproduction;
an adjustment step of adjusting a maximum value of the disparity between the image for left eye and the image for right eye of the stereo image on the basis of the representative value determined by the determination step and the mode that has been set by the mode setting unit; and
a generation step of generating a stereo image from the image for left eye and the image for right eye for which the disparity has been adjusted in the adjustment step and outputting the generated stereo image, wherein
in the adjustment step, a maximum value of the disparity in the first mode is made less than a maximum value of the disparity in the normal reproduction and a maximum value of the disparity in the second mode is made less than a maximum value of the disparity in the first mode.

11. The control method according to claim 10, wherein in the adjustment step, the maximum value of the disparity between the image for left eye and the image for right eye of the stereo image is adjusted when a reproduction speed of the mode that has been set by the mode setting step is higher than a threshold value.

12. The control method according to claim 10, wherein in the adjustment step, the maximum value of the disparity between the image for left eye and the image for right eye is decreased as a reproduction speed of the mode that has been set by the mode setting step increases.

13. The control method according to claim 10, wherein in the adjustment step, the disparity between the image for left eye and the image for right eye is uniformly decreased by a same value.

14. The control method according to claim 10, wherein in the adjustment step, the disparity after the adjustment is calculated by multiplying the disparity between the image for left eye and the image for right eye by a reduction ratio determined in use of a reproduction speed of the mode that has been set by the mode setting step.

15. The control method according to claim 13, wherein in the adjustment step, the disparity between the image for left eye and the image for right eye is decreased by shifting the image for left eye in a horizontal direction relative to the image for right eye.

16. The control method according to claim 11, wherein in the adjustment step, the threshold value is decreased as the representative value increases.

17. The control method according to claim 14, wherein in the adjustment step, the reduction ratio is set so that a representative value of the disparity after the adjustment is equal to or less than an allowed value determined according to the reproduction speed of the mode that has been set by the mode setting step.

18. The control method according to claim 15, wherein in the adjustment step, a shift value is set so that a representative value of the disparity after the adjustment is equal to or less than an allowed value determined according to the reproduction speed of the mode that has been set by the mode setting step.

* * * * *